United States Patent
Eisert

(10) Patent No.: US 9,088,141 B2
(45) Date of Patent: Jul. 21, 2015

(54) SUPPORT STAND FOR SCREENING TERMINALS

(75) Inventor: Klaus Eisert, Blomberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 14/009,022

(22) PCT Filed: Mar. 27, 2012

(86) PCT No.: PCT/EP2012/055408
§ 371 (c)(1),
(2), (4) Date: Sep. 30, 2013

(87) PCT Pub. No.: WO2012/130843
PCT Pub. Date: Oct. 4, 2012

(65) Prior Publication Data
US 2014/0021306 A1    Jan. 23, 2014

(30) Foreign Application Priority Data

Mar. 31, 2011  (DE) .......................... 10 2011 001 715

(51) Int. Cl.
| | |
|---|---|
| *H01R 4/48* | (2006.01) |
| *H02G 5/02* | (2006.01) |
| *H01R 9/26* | (2006.01) |

(52) U.S. Cl.
CPC ............. *H02G 5/025* (2013.01); *H01R 9/2675* (2013.01); *H01R 9/2691* (2013.01)

(58) Field of Classification Search
CPC ........ H01R 9/24; H01R 9/2408; H01R 63/06; H01R 9/2675; H01R 9/26; H01R 31/02; H01R 4/4845
USPC .......................... 439/709–717, 724, 834, 835
See application file for complete search history.

(56) References Cited

U.S. PATENT DOCUMENTS 3,824,553 A  *  7/1974  Glover et al. ................. 439/717
4,776,815 A     10/1988  Baillet
(Continued)

FOREIGN PATENT DOCUMENTS

| CN | 1154582 A | 7/1997 |
| DE | 7822790 | 11/1978 |

(Continued)

OTHER PUBLICATIONS

International Search Report issued in PCT/EP2012/055408 on May 31, 2012.

(Continued)

*Primary Examiner* — Thanh Tam Le
(74) *Attorney, Agent, or Firm* — DLA Piper LLP (US)

(57) ABSTRACT

Support stands for screening terminals are disclosed, such as a support stand having a main body comprised of a receiving device for a bus bar and a fixing device for fixing the bus bar in the receiving device. According to illustrative implementations, the main body can be latched onto a mounting rail in such a way that, when the bus bar is fixed in the receiving device by the fixing device, the longitudinal extension of the mounting rail is parallel to a longitudinal extension of the bus bar. In further implementations, the receiving device and the fixing device may be designed in conjunction with the bus bar to achieve various configurations and/or arrangements having specified angular position(s) of the bus bar.

20 Claims, 5 Drawing Sheets

(56) References Cited

U.S. PATENT DOCUMENTS

| | | | | |
|---|---|---|---|---|
| 4,989,118 | A | * | 1/1991 | Sorenson ..................... 361/673 |
| 5,411,417 | A | * | 5/1995 | Horn et al. ................... 439/709 |
| 5,651,702 | A | * | 7/1997 | Hanning et al. ............. 439/715 |
| 5,853,304 | A | * | 12/1998 | Landreau et al. ............ 439/721 |
| 6,146,213 | A | * | 11/2000 | Yoon ............................ 439/716 |
| 6,656,001 | B2 | * | 12/2003 | Ginschel et al. ............. 439/835 |
| 6,680,842 | B1 | * | 1/2004 | Pelaez et al. ................. 361/631 |
| 6,916,214 | B2 | * | 7/2005 | Conrad ......................... 439/716 |
| 7,192,316 | B1 | * | 3/2007 | Pollmann ..................... 439/716 |
| 7,553,199 | B2 | * | 6/2009 | Correll ......................... 439/715 |
| 7,658,653 | B2 | * | 2/2010 | Diekmann et al. ........... 439/715 |
| 2002/0127920 | A1 | | 9/2002 | Ginschel |

FOREIGN PATENT DOCUMENTS

| | | |
|---|---|---|
| DE | 3024843 | 2/1982 |
| DE | 3701955 | 7/1987 |
| DE | 9201410 U1 | 4/1992 |
| DE | 9315475.5 | 2/1994 |
| DE | 19610854 | 9/1997 |
| DE | 19642953 | 4/1998 |
| EP | 0443056 | 8/1991 |
| EP | 1195851 | 4/2002 |
| FR | 2358757 | 2/1978 |
| JP | UM-A-4-121785 | 10/1992 |
| JP | U3067677 | 1/2000 |

OTHER PUBLICATIONS

International Preliminary Report on Patentability issued in PCT/EP2012/055408 on Oct. 2, 2013.

Written Opinion issued in PCT/EP2012/055408 on Oct. 2, 2013.

Machine English Language Translation of DE 9201410 published Apr. 2, 1992.

Machine English Language Translation of DE 7822790 published Nov. 2, 1978.

Machine English Language Translation of DE 9315475 published Jan. 13, 1994.

Machine English Language Translation of FR 2358757 published Feb. 10, 1978.

Machine English Language Translation of EP 0443056 published Aug. 28, 1991.

Machine English Language Translation of EP 1195851 published Apr. 10, 2002.

Machine English Language Translation of DE 3024843 published Feb. 4, 1982.

Machine English Language Translation of DE 19610854 published Sep. 11, 1997.

Machine English Language Translation of DE 19642953 published Apr. 23, 1998.

Machine English Language Translation of DE 3701955 published Jul. 30, 1987.

Office Action dated Sep. 30, 2014 received in Japanese counterpart application No. 2014-501578, including English language translation, 5 pages total.

Office Action of Apr. 28, 2015, received from State Intellectual Property Office of P.R.C. (Chinese Patent Office) in related application, as well as English-language translation/summary thereof, 12 pages.

Machine Translation of CN 1154582A into English language, printed May 20, 2015, 16 pages.

* cited by examiner

SUPPORT STAND FOR SCREENING TERMINALS

CROSS-REFERENCE TO RELATED APPLICATIONS

This application is a U.S. National Stage Application of International Application No. PCT/EP2012/055408 filed Mar. 27, 2012, published as WO2012/130843, which claims priority from German Patent Application No. 10 2011 001 715.1 filed Mar. 31, 2011. The entirety of all the above-listed Applications are incorporated herein by reference.

BACKGROUND

1. Field

The invention relates to a support stand for screening terminals, comprising a main body, wherein the main body comprises a receiving device for a bus bar and a fixing device for fixing the bus bar in the receiving device.

2. Description of Related Information

Support stands, also known form the prior art as a holding device for bus bars, are used to mount screening terminals on mounting rails, for example in switch cabinets, such that cables can be fixed by means of the screening terminals to a bus bar provided on the support stand, wherein the cables, relieved of strain by the screening terminals, can be fitted on a connection and/or connecting terminal, which is latched on the mounting rail, or can be connected to the connection and/or connecting terminal. Besides the strain relief, an EMC-compatible wiring of the cables can be achieved by a conductive support stand since the cable shields of the cables are electrically conductively connected to the mounting rail via the conductive screening terminals, the bus bar and the support stand, such that, in the case of an earthed mounting rail, an earthing for the cable shields is likewise provided.

The support stands known from the prior art are designed only for use with a specific type or size of connection and/or connecting terminals, or are designed to be height-adjustable with regard to differently sized connection and/or connecting terminals, in such a way that the bus bar provided for mounting of the screening terminals can be fixed at a variable distance and height from the mounting rail. The latter constructions are in many cases less stable however due to the complicated mechanics and/or require much more space, which is generally only available to a very small extent, particularly with use in switch cabinets.

DETAILED DESCRIPTION

Figure 1:
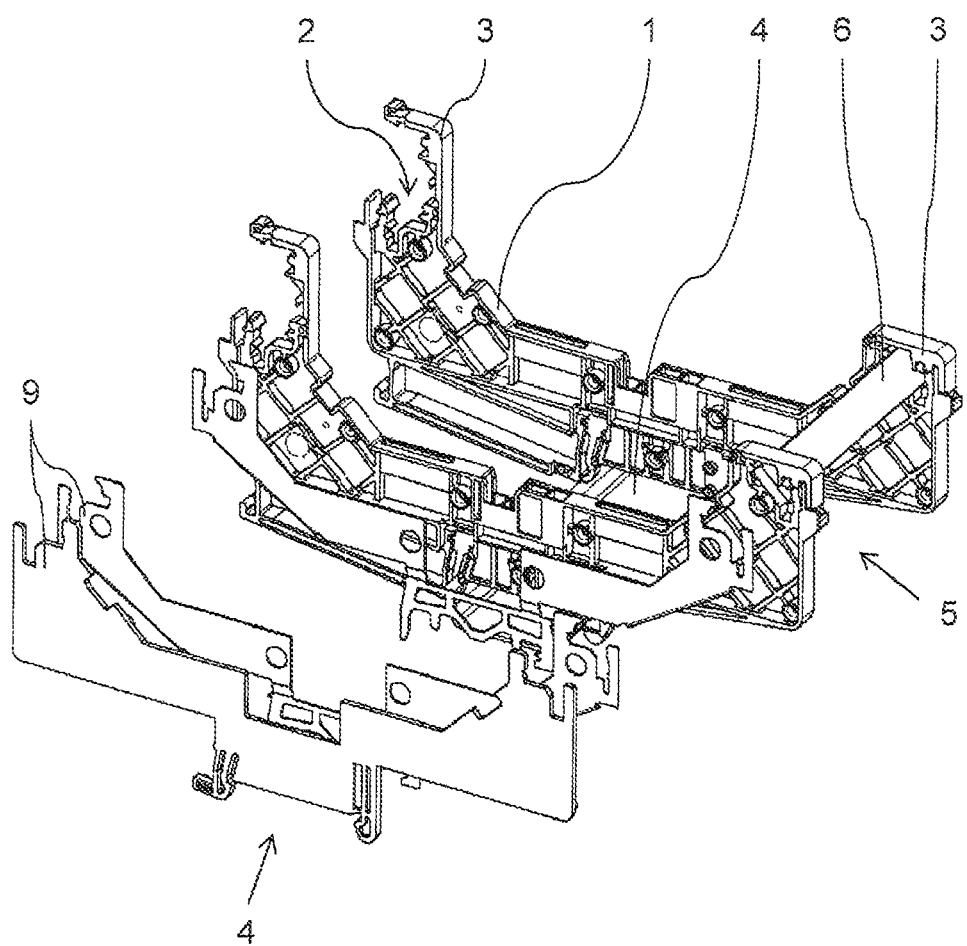
FIG. 1 shows a "twin support stand" according to the invention in an exploded view in accordance with a preferred embodiment of the invention.

The object of the invention is therefore to provide a support stand for screening terminals, which can be used universally even in very confined spaces for connection and/or connecting terminals of a wide range of sizes, and here enables a stable fixing of the screening terminals to the mounting rail via the support stand.

The object is achieved in accordance with the invention by the features of the independent claim. Advantageous embodiments of the invention are disclosed in the dependent claims.

In accordance with the invention, the object is achieved by a support stand for screening terminals, wherein the support stand comprises a main body, the main body comprises a receiving device for a bus bar and a fixing device for fixing the bus bar in the receiving device, the main body can be latched onto a mounting rail in such a way that, when the bus bar is fixed by means of the fixing device in the receiving device, the longitudinal extension of the mounting rail is parallel to the longitudinal extension of the bus bar, the receiving device is designed in such a way that the bus bar can be received in the receiving device in any angular position rotated about its longitudinal axis, and in such a way that, when the bus bar is received in the receiving device, the bus bar bears at least in part against the receiving device in the angular position, and the fixing device is designed in such a way that the bus bar can be fixed in the angular position.

In accordance with the invention, in contrast to the prior art, the bus bar can thus be fixed on the main body in any angular position rotated about its longitudinal axis, such that, by means of screening terminals known from the prior art, cables can thus be guided in an angular position predefined by the inclination of the bus bar to a connection and/or connecting terminal provided on the mounting rail or can be connected to the connection and/or connecting terminal. The support stand according to the invention can thus be used in a particularly universal manner for a multiplicity of connection and/or connecting terminals of different heights and sizes, even in extremely confined spaces. In other words, in contrast to the prior art, where the bus bar was fixed only in a single position to the main body, that is to say the bus bar and the mounting rail had a fixed angle to one another in their transverse extensions, the support stand according to the invention allows the cable fastened on the bus bar to be advanced in a versatile manner through different angular positions of the bus bar relative to the mounting rail and with respect to the "height" of the connection and/or connecting terminal.

The main body of the support stand can be designed arbitrarily, for example can be formed from a plastic and/or from a metal. The receiving device and the fixing device may likewise be formed as any means known from the prior art for receiving or fixing the bus bar respectively. The same is also true for the bus bar and the mounting rail, which can each be formed as any bar or rail known from the prior art, preferably for use in a switch cabinet.

The receiving device is preferably formed in such a way in the region in which the bus bar bears at least in part against the receiving device that the receiving device for example has a bent, round or oval profile, such that the bus bar bears against the receiving device in the tangential point of the curved surface of the receiving device, preferably directly. The receiving device may also have a profile that runs in a straight line over portions, wherein the profile bends away between two straight extensions, in each case by an angle such as 10° or 30°, such that different straight extensions having different angular positions are formed relative to the mounting rail.
}

In any case, in accordance with the invention, the receiving device is designed in such a way in the region in which the bus bar can be fitted at least in part onto the receiving device that the bus bar, when fitted onto the receiving device and with regard to its transverse extension, may have any angle to the transverse extension of the mounting rail and can be fixed to the holding device at the specific angle by means of the fixing device.

In accordance with a further preferred embodiment, the main body comprises a second receiving device for a second bus bar and a second fixing device for fixing the second bus bar in the second receiving device, and the receiving device is arranged opposite the second receiving device in such a way that, when the main body is latched onto the mounting rail, the main body is arranged between the receiving device and the second receiving device. In accordance with this embodiment, the support stand is thus designed as a "twin support stand", that is to say therefore enables a cable to be advanced towards and fixed to the connection and/or the connecting terminal from either side. In conjunction with this embodiment, it is noted that all embodiments described hereinafter may likewise be designed as "twin support stands" of this type, even if this is not explicitly mentioned.

In accordance with another preferred embodiment of the invention, the main body comprises a single receiving device and a single fixing device corresponding thereto. In this preferred embodiment, the support stand is therefore designed in such a way that, in contrast to the prior art, only a single receiving device and a single fixing device are provided, wherein the bus bar can be received in this single receiving device and fixed by means of this single fixing device in any angular position rotated about its longitudinal axis. The support stand according to the invention can thus be used particularly universally with a multiplicity of different connection and/or connecting terminals of a wide range of sizes and heights.

In principle, as already mentioned, the main body can be designed arbitrarily. In accordance with a particularly preferred exemplary embodiment of the invention, the main body comprises a metal insert however, wherein the metal insert is designed in such a way that, when the bus bar is received in the receiving device, the bus bar bears at least in part against the metal insert in the angular position. Since the insert is formed from a metal, the bus bar can be fitted to the metal insert in a substantially "non-rotatable manner", since metal is much more torsion-resistant, for example compared to a main body formed from a plastic.

In accordance with a particularly preferred exemplary embodiment of the invention, the receiving device and the fixing device are designed in such a way that the bus bar can be received in the receiving device in three selectable angular positions rotated about its longitudinal axis, and the bus bar can be fixed in the three angular positions. The bus bar can therefore be fixed in the support stand in three dedicated angular positions, and therefore relative to the mounting rail. For example, for an embodiment of this type, the receiving device can be designed in such a way that the region in which the bus bar can be fitted at least in part to the receiving device has a contour, such that three substantially straight "edges" of the contour are provided and are interrupted by "kinks" in the contour. In this regard, it is most preferable for the receiving device and the fixing device to be designed in such a way that, when the main body is latched onto the mounting rail and the bus bar is fixed in the receiving device, the respective transverse extensions of the bus bar and of the mounting rail form an angle to one another of 0° in a first angular position, of 45° in a second angular position, and of 90° in a third angular position. As a result of such an embodiment, a support stand can be produced for example, which, for at least three connecting terminals of different size, enables the cable to be advanced towards the connecting terminal in a particularly simple manner by fitting the bus bar to the receiving device in the desired angular position and fixing the bus bar in the desired angular position.

In accordance with a further preferred embodiment of the invention, the receiving device and/or the metal insert in each angular position has/have two detent means for latching the bus bar. The two detent means are preferably arranged in such a way that the bus bar can be latched between the detent means. The detent means are most preferably designed as a depositing edge and/or as a metal clamp on the metal insert. As a result of an embodiment, a first fixing of the bus bar to the receiving device can be achieved merely by the insertion of the bus bar into the receiving device, wherein the bus bar can then be fixed ultimately in a second step by means of the fixing device.

In principle, the receiving device and the fixing device can be arranged arbitrarily on the main body. In accordance with a particularly preferred embodiment however, when the main body is latched onto the mounting rail, the receiving device and the fixing device on the main body are distanced from the mounting rail in the transverse extension of the mounting rail. Likewise, it is preferable, when the main body is latched onto the mounting rail, for the receiving device and the fixing device on the main body to be distanced from the mounting rail perpendicular to the transverse extension of the mounting rail.

It is further preferable for the fixing device, which in principle can be designed as any fixing device known from the prior art, to be designed as a manually actuatable clip closure. Here, the clip closure can be fastened on one of its sides to the receiving device, for example fastened pivotably, and, to fix the bus bar in the receiving device, can be pivoted towards the bus bar in such a way that the fixing device latches via a detent means by means of the receiving device in order to fix the bus bar in the receiving device. Precisely due to the fact that the clip closure is manually actuatable, the bus bar can be fixed in a particularly simple manner to the receiving device without use of a special tool.

In accordance with a further preferred embodiment of the invention, the main body is designed in such a way that, when the main body is latched onto the mounting rail and the bus bar is received in the receiving device, an electrical connection is produced between the mounting rail and the bus bar. Under the assumption that the mounting rail is earthed, the cable shield of a cable fastened to the bus bar can thus be earthed in a particularly simple manner, such that an EMC-compliant wiring can be produced in a particularly simple manner. In an alternative embodiment, it is preferable for the main body to comprise the metal insert, but for no electrical connection to exist between the mounting rail and the bus bar.

The invention will be explained in greater detail hereinafter with reference to the accompanying drawing on the basis of preferred embodiments.

A "twin support stand" according to the invention can be seen in an exploded view in FIG. 1. The support stand comprises a main body 1, a receiving device 2 and a fixing device 3, which are produced in the present case in one piece from a plastic.

The fixing device 3 is designed as a manually actuatable clip closure. The main body 1 can be latched onto a mounting rail 4 illustrated by the arrow 4, wherein the mounting rail 4 is designed as a mounting rail 4 known from the prior art for receiving electrical connection and/or connecting terminals.

Here, the aforementioned connection and/or connecting terminals are preferably arranged between two support stands 1, 2, 3, as indicated by the arrow 5, wherein the aforementioned connection and/or connecting terminals can also be latched onto the mounting rail 4. The receiving device 2 is designed to receive a bus bar 6, wherein the bus bar 6, when inserted in the receiving device 2, can be fixed non-rotatably in the receiving device 2 by the fixing device 3 in the specific angular position rotated about its longitudinal axis of the bus bar 6.

To this end, the receiving device 2 is designed in accordance with the invention in such a way that the bus bar 6 can be received in the receiving device 2 in any angular position rotated about its longitudinal axis, in such a way that the bus bar 6, in the specific angular position, bears at least in part against the receiving device 2, as indicated by the arrow 7. The fixing device 3 according to the invention is also designed in such a way that the fixing device 3 fixes the bus bar 6 in the receiving device 2 in the specific angular position. In other words, in accordance with the invention, one bus bar 6 can be fixed in a single receiving device 2 and in a single fixing device 3 corresponding thereto in any angular position rotated about its longitudinal axis, for example in that the holding device 2 has a curved or semi-circular contour facing the bus bar 6, such that the bus bar 6 can be fixed in the support stand in any angular position about its longitudinal axis so as to bear against the tangential point 7 of the semi-circular contour.

Figure 2:
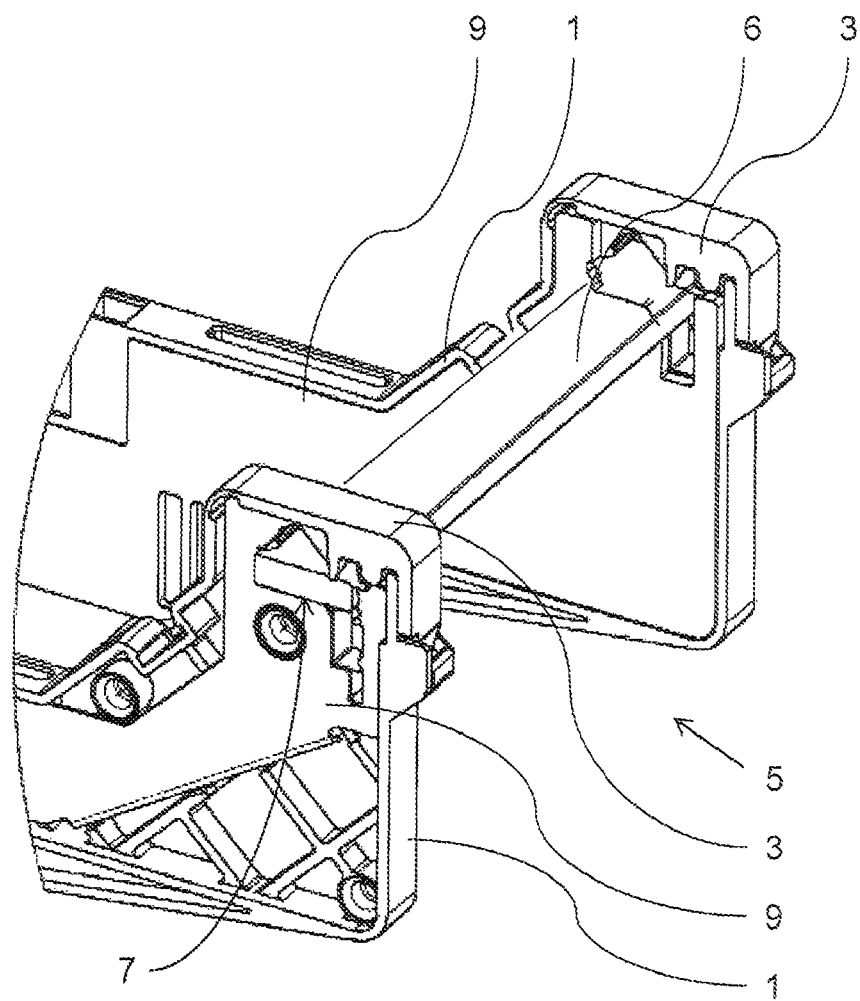
FIG. 2 shows a perspective partial view of the support stand according to the invention with a bus bar in a first angular position.
Figure 3:
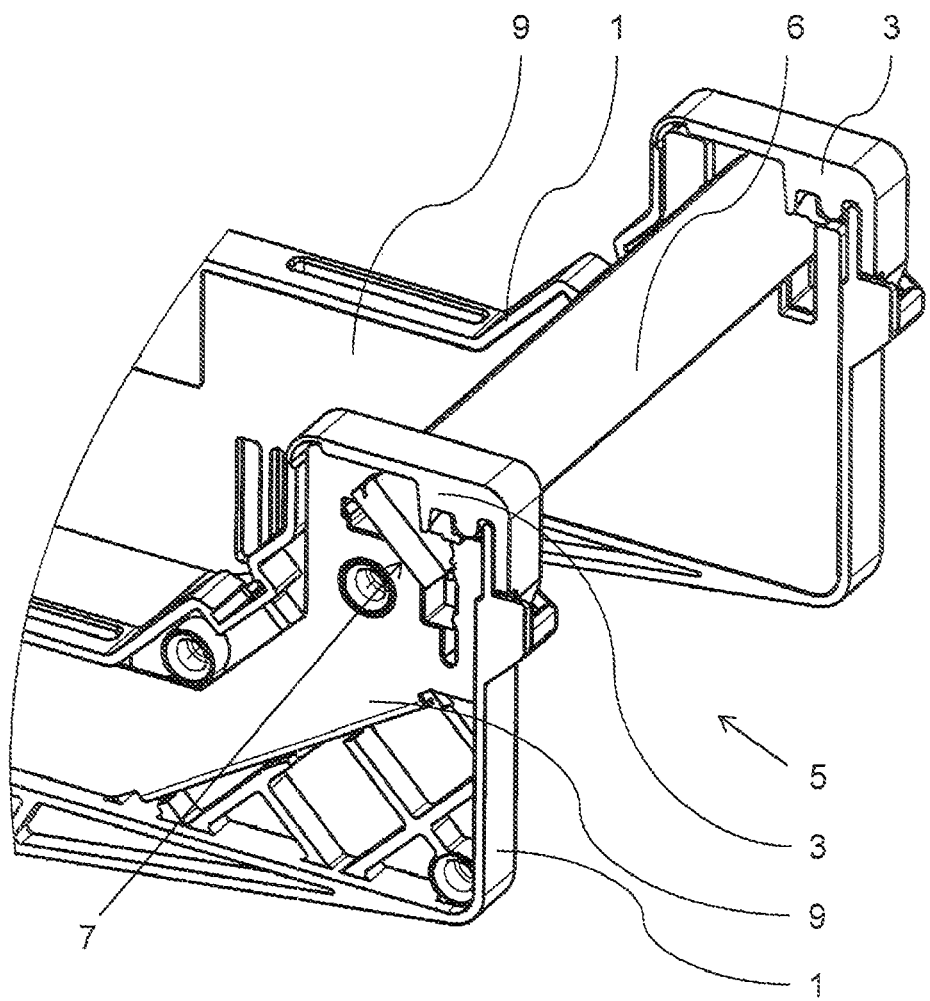
FIG. 3 shows a perspective partial view of the support stand according to the invention with a bus bar in a second angular position.
Figure 4:
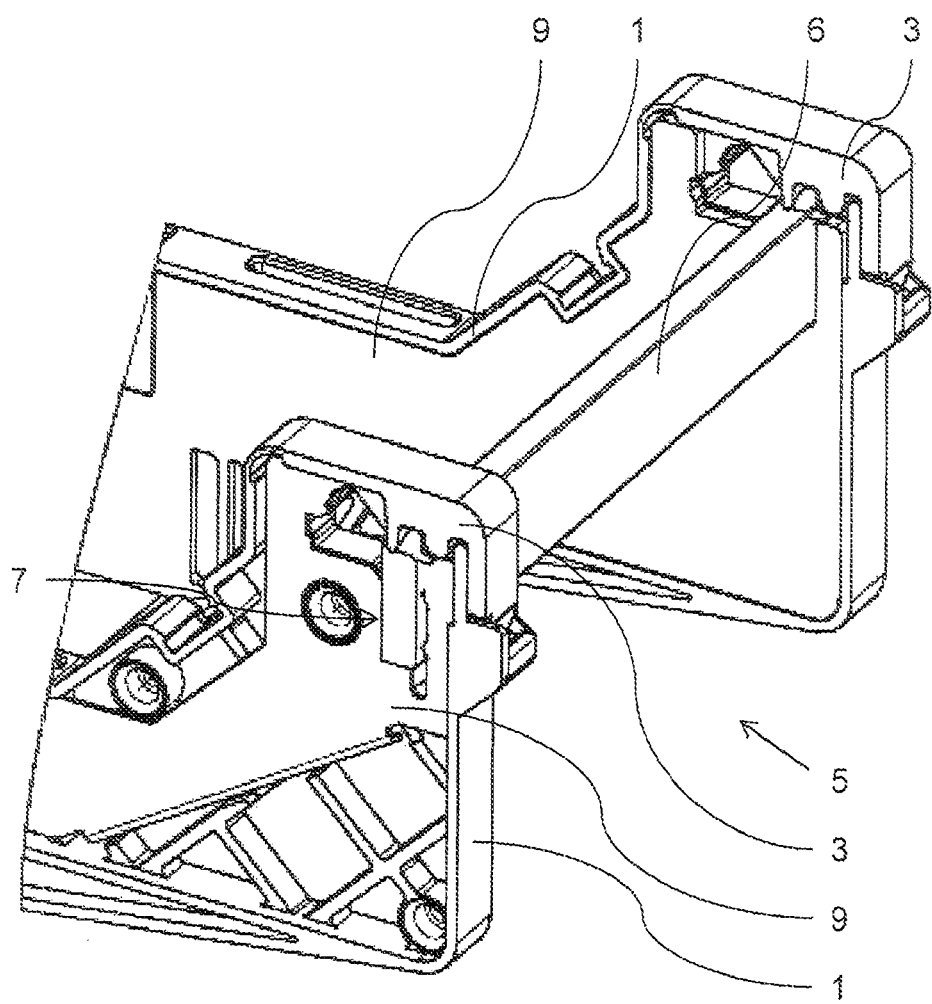
FIG. 4 shows a perspective partial view of the support stand according to the invention with a bus bar in a third angular position.

This is illustrated specifically in FIG. 2 to FIG. 4, in which the bus bar 6 is received in the receiving device 2 in three different angular positions about its longitudinal axis and is fixed by the fixing device 3. Here, the angular positions shown in FIG. 2 to FIG. 4 enclose the angles of 0°, 45° and 90° between the transverse extensions of the bus bar 6 and the mounting rail 4. To this end, the receiving device 2 is formed in such a way that the bus bar 6 can bear at least in part in each of the angular positions against the receiving device 2, as illustrated by the arrow 7.

Figure 5:
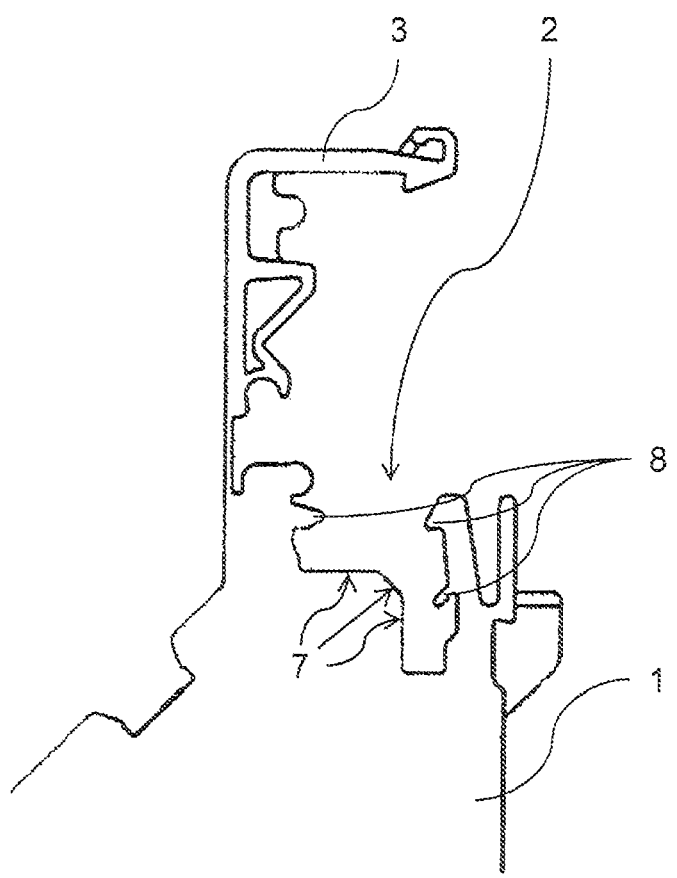
FIG. 5 shows a schematic plan view of the receiving device and fixing device according to the invention without inserted bus bar.

As can also be seen in detail from FIG. 5, the receiving device 2, for each of these angular positions of 0°, 45° and 90°, has two detent means 8, which are designed to latch with the bus bar 6. Here, the detent means 8 are formed in the present case as detent lugs, depositing edges and metal clamps, as can be seen from FIG. 5. This means that the bus bar 6 can be latched in the receiving device 2 merely by inserting the bus bar 5 into the receiving device 2.

Furthermore, a metal insert 9 is provided, for example visible in FIG. 1, wherein the metal insert 9 is designed in such a way that, when the bus bar 6 is received in the receiving device 2, the bus bar 6 bears at least in part against the metal insert 9 in the specific angular position. Here, two metal inserts 9 may also be provided, which each bear against an outer face of main body 1 and thus surround the main body 1. Furthermore, an electrically conductive connection can be achieved between the bus bar 6 and the mounting rail 4 by means of the metal insert 9.

LIST OF REFERENCE SIGNS main body 1
receiving device 2
fixing device 3
mounting rail 4
gap 5
bus bar 6
bearing position symbolised by arrow 7
detent means 8
metal insert 9

The invention claimed is:

1. A support stand for screening terminals, comprising:
a main body, wherein the main body comprises a receiving device for a bus bar and a fixing device for fixing the bus bar in the receiving device,
wherein the main body can be latched onto a mounting rail in such a way that, when the bus bar is fixed by a means of the fixing device in the receiving device, a longitudinal extension of the mounting rail is parallel to a longitudinal extension to the bus bar,
wherein the receiving device is designed in such a way that the bus bar can be received in the receiving device in any angular position rotated about its a longitudinal axis, and in such a way that, when the bus bar is received in the receiving device, the bus bar bears at least in part against the receiving device in the angular position,
wherein the fixing device is designed in such a way that the bus bar can be fixed in the angular position, and
wherein the receiving device and the fixing device are designed in such a way that, when the main body is latched onto the mounting rail and the bus bar is fixed in the receiving device, respective transverse extensions of the bus bar and transverse extensions of the mounting rail form an angle to one another of 0° in a first angular position, of 45° in a second angular position an, and of 90° in a third angular position.

2. The support stand according to claim 1, wherein the main body comprises a second receiving device for a second bus bar and a second fixing device for fixing the second bus bar in the second receiving device, and the receiving device is arranged opposite the second receiving device in such a way that, when the main body is latched onto the mounting rail, the main body is arranged between the receiving device and the second receiving device.

3. The support stand according to claim 1, wherein the main body comprises a single receiving device and an associated single fixing device corresponding to the single receiving device.

4. The support stand according to claim 1, further comprising a metal insert, wherein the metal insert is designed in such a way that, when the bus bar is received in the receiving device, the bus bar bears at least in part against the metal insert in the angular position.

5. The support stand according to claim 1, wherein the receiving device and the fixing device are designed in such a way that the bus bar can be received in the receiving device in three selectable angular positions rotated about a longitudinal axis and the bus bar can be fixed in the three angular positions.

6. The support stand according to claim 1, wherein, when the main body is latched onto the mounting rail, the receiving device and the fixing device on the main body are distanced from the mounting rail in a transverse direction of the mounting rail.

7. The support stand according to claim 1, wherein the fixing device is designed as a manually actuatable clip closure.

8. The support stand according to claim 1, wherein the main body is designed in such a way that, when the main body is latched onto the mounting rail and the bus bar is received in the receiving device, an electrical connection is produced between the mounting rail and the bus bar.

9. The support stand according to claim 1, wherein the receiving device and/or the metal insert in each angular position having two detent means for latching the bus bar.

10. A support stand, for screening terminals, comprising:
a main body, wherein the main body comprises a receiving device for a bus bar and a fixing device for fixing the bus bar in the receiving device; and
a metal insert, wherein the metal insert is designed in such a way that, when the bus bar is received in the receiving device, the bus bar bears at least in part against the metal insert in the angular position;
wherein the main body can be latched onto a mounting rail in such a way that, when the bus bar is fixed by a means of the fixing device in the receiving device, a longitudinal extension of the mounting rail is parallel to a longitudinal extension to the bus bar;
wherein the receiving device is designed in such a way that the bus bar can be received in the receiving device in any angular position rotated about a longitudinal axis, and in such a way that, when the bus bar is received in the receiving device, the bus bar bears at least in part against the receiving device in the angular position;
wherein the fixing device is designed in such a way that the bus bar can be fixed in the angular position; and
wherein the receiving device and/or the metal insert in each angular position having two detent means for latching the bus bar.

11. The support stand according to claim 10, wherein the receiving device and the fixing device are designed in such a way that the bus bar can be received in the receiving device in three selectable angular positions rotated about a longitudinal axis and the bus bar can be fixed in the three angular positions.

12. The support stand according to claim 10, wherein the receiving device and the fixing device are designed in such a way that, when the main body is latched onto the mounting rail and the bus bar is fixed in the receiving device, the respective transverse extensions of the bus bar and transverse extensions of the mounting rail form an angle to one another of 0° in a first angular position, of 45° in a second angular position an, and of 90° in a third angular position.

13. The support stand according to claim 10, wherein the main body comprises a second receiving device for a second bus bar and a second fixing device for fixing the second bus bar in the second receiving device, and the receiving device is arranged opposite the second receiving device in such a way that, when the main body is latched onto the mounting rail, the main body is arranged between the receiving device and the second receiving device.

14. The support stand according to claim 10, wherein the main body comprises a single receiving device and an associated single fixing device corresponding to the single receiving device.

15. A support stand for screening terminals, comprising:
a main body, wherein the main body comprises a receiving device for a bus bar and a fixing device for fixing the bus bar in the receiving device;
wherein the main body can be latched onto a mounting rail in such a way that, when the bus bar is fixed by a means of the fixing device in the receiving device, a longitudinal extension of the mounting rail is parallel to a longitudinal extension to the bus bar;
wherein the receiving device is designed in such a way that the bus bar can be received in the receiving device in any angular position rotated about a longitudinal axis, and in such a way that, when the bus bar is received in the receiving device, the bus bar bears at least in part against the receiving device in the angular position,
wherein the fixing device is designed in such a way that the bus bar can be fixed in the angular position;
wherein the receiving device and the fixing device are designed in such a way that the bus bar can be received in the receiving device in three selectable angular positions rotated about its longitudinal axis and the bus bar can be fixed in the three angular positions;
wherein the receiving device and/or the metal insert in each angular position having two detent means for latching the bus bar.

16. The support stand according to claim 15, wherein the main body comprises a second receiving device for a second bus bar and a second fixing device for fixing the second bus bar in the second receiving device, and the receiving device is arranged opposite the second receiving device in such a way that, when the main body is latched onto the mounting rail, the main body is arranged between the receiving device and the second receiving device.

17. The support stand according to claim 15, wherein the main body comprises a single receiving device and an associated single fixing device corresponding to the single receiving device.

18. The support stand according to claim 15, wherein, when the main body is latched onto the mounting rail, the receiving device and the fixing device on the main body are distanced from the mounting rail in a transverse direction of the mounting rail.

19. The support stand according to claim 15, wherein the fixing device is designed as a manually actuatable clip closure.

20. The support stand according to claim 15, wherein the main body is designed in such a way that, when the main body is latched onto the mounting rail and the bus bar is received in the receiving device, an electrical connection is produced between the mounting rail and the bus bar.

* * * * *